July 12, 1960

W. H. BIXBY 2,945,172

CURRENT SUPPLY APPARATUS

Filed May 16, 1957

INVENTOR
W. H. BIXBY
BY
*G. F. Heuerman*
ATTORNEY

July 12, 1960

W. H. BIXBY

2,945,172

CURRENT SUPPLY APPARATUS

Filed May 16, 1957

INVENTOR
W. H. BIXBY
BY
G. F. Heuerman
ATTORNEY

July 12, 1960  W. H. BIXBY  2,945,172
CURRENT SUPPLY APPARATUS
Filed May 16, 1957  4 Sheets-Sheet 3

INVENTOR
W. H. BIXBY
BY
ATTORNEY

July 12, 1960 W. H. BIXBY 2,945,172
CURRENT SUPPLY APPARATUS
Filed May 16, 1957 4 Sheets-Sheet 4

FIG. 7

INVENTOR
W. H. BIXBY
BY
ATTORNEY

United States Patent Office

2,945,172
Patented July 12, 1960

2,945,172

CURRENT SUPPLY APPARATUS

William H. Bixby, Columbus, Ohio, assignor to Power Equipment Company, Galion, Ohio, a corporation of Michigan Filed May 16, 1957, Ser. No. 659,720

13 Claims. (Cl. 321—19)

This invention relates to current supply apparatus and particularly to apparatus for controlling the supply of rectified current from an alternating-current supply source to a load.

An object of the invention is to provide improved apparatus for controlling the supply of rectified current to a load to minimize load voltage changes.

In a specific embodiment of the invention, herein shown and described for the purpose of illustration, rectified current from an alternating-current supply source is supplied through the impedance or power windings of a saturable reactor to a load. The impedance of the impedance windings of the saturable reactor is controlled by current supplied to a control winding of the saturable reactor from the output of a magnetic amplifier. A voltage having variations corresponding to load voltage changes is impressed upon the input or control circuit of the magnetic amplifier to control its output current. The saturable reactor is also provided with a feedback or stabilizing winding which is connected in series with the control winding of the magnetic amplifier. The feedback voltage induced in the stabilizing winding in response to a current change in the control winding of the saturable reactor functions to slow down flux changes in the magnetic circuit of the saturable reactor to prevent overshooting of the load voltage or "hunting."

To compensate for changes of line voltage there is provided a compensating circuit for deriving from the line voltage source and impressing upon the magnetic amplifier for energizing it a voltage which decreases in response to an increase of line voltage and vice versa. Introducing the line voltage compensation at the magnetic amplifier, rather than at the saturable reactor, has the advantage that the correcting circuit is required to handle less current.

In a modified embodiment of the invention employing three-phase operation, a saturable reactor and a rectifier are provided for each of the three phases of the alternating current, each rectifier supplying a portion of the load current. To reduce the cost of the apparatus, a single magnetic amplifier may be provided for supplying current to the control windings in series of the three saturable reactors, respectively. To minimize or substantially prevent unbalances of the currents supplied to the load through the saturable reactors, respectively, each reactor is provided with balancing windings for introducing in each reactor core a magnetomotive force which reduces the saturation in the reactor carrying the greater current and increases the saturation in the reactor carrying the lesser current.

In another embodiment of the invention, the current supply circuit is designed so as to compensate for line voltage changes without requiring the use of the line compensating circuit mentioned above. In this embodiment, current supplied to a biasing-stabilizing winding of the saturable reactor sets up a magnetomotive force in the magnetic circuit of the saturable reactor which aids the magnetomotive forces due to the currents supplied to the impedance windings. The current supplied to the control winding of the magnetic amplifier sets up a magnetomotive force which aids the magnetomotive force due to the currents supplied to the impedance windings of the magnetic amplifier. A sudden increase in line voltage, for example, causes the output voltages of both the saturable reactor and the magnetic amplifier to increase. However, the increased output current of the magnetic amplifier supplied to the control winding of the saturable reactor sets up a magnetomotive force in the magnetic circuit of the saturable reactor which opposes the magnetomotive force set up by the currents supplied to the impedance windings of the saturable reactor. The increased output of the saturable reactor in response to an increase in line voltage, and vice versa, is thus minimized or substantially prevented.

The invention will now be described in greater detail with reference to the accompanying drawing in which.

Figure 1:
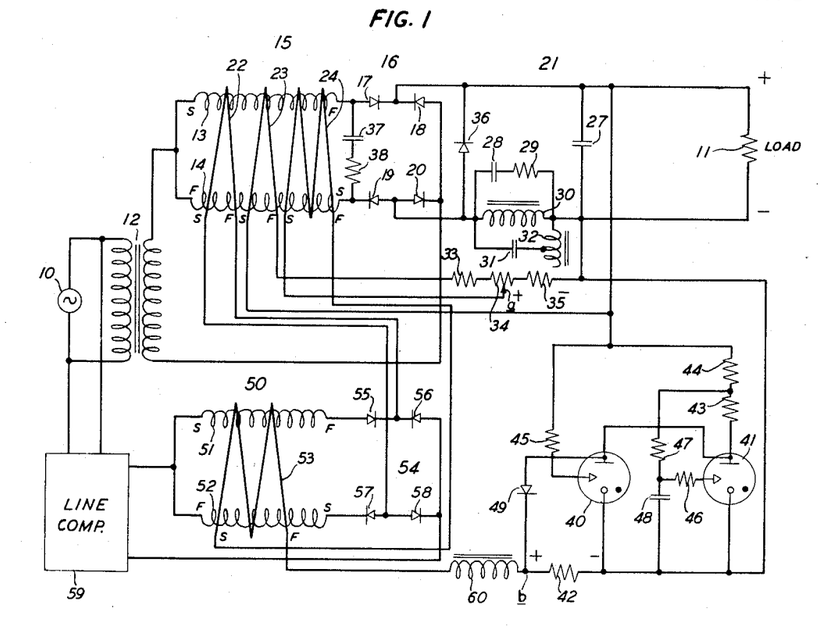
Fig. 1 is a schematic view of a current supply apparatus embodying the invention.
Figure 5:
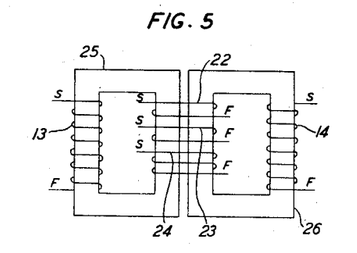
Fig. 5 is a schematic view of a saturable reactor which may be used in the current supply circuit of Fig. 1.

Referring particularly to Fig. 1 of the drawing, rectified current from an alternating-current supply source 10 is supplied to a load 11 through a circuit comprising a transformer 12, impedance or power windings 13 and 14 of a saturable reactor 15, a rectifier 16 having rectifying elements 17, 18, 19 and 20 and a ripple filter 21. The saturable reactor 15 also comprises a control winding 22, a bias winding 23 and a stabilizing winding 24, said windings having 25 turns, 20 turns and 500 turns, respectively, for example. The circuit comprising saturable reactor 15 and rectifier 16, of course, is a magnetic amplifier circuit for controlling the output voltage of the rectifier 16 in response to control current supplied to winding 22. Winding 13 is wound on a first core 25 of magnetic material forming a closed flux path, winding 14 is wound on a second core 26 of magnetic material forming a closed flux path and windings 22, 23 and 24 are common to both cores. The windings are similarly wound from start "S" to finish "F" as shown in Fig. 5. Alternatively, there may be employed a three-legged core having windings 13 and 14 on the outer legs, respectively, and windings 22, 23 and 24 on the middle leg. Moreover, instead of mounting windings 22, 23 and 24 on both cores, as shown, a pair of each of windings 22, 23, and 24 may be employed, one of each of these windings for each of cores 25 and 26. The ripple filter 21 comprises a shunt condenser 27 across the load 11 and series impedance in a current path connecting the negative output terminal of rectifier 16 to the negative load terminal. The series impedance of the filter 21 has three paths in parallel. One of the three paths comprises a condenser 28 and a resistor 29 in series, a second path comprises inductor 30 and the third path comprises a condenser 31 and an inductor 32 in series. The filter is of the type disclosed in United States Patent No. 1,568,144 to H. W. Elsasser, January 5, 1926. If the frequency of the supply source 10 is 60 cycles per second, for example, the filter 21 is designed to pass direct current to the load 11 and to suppress ripple components of 120 cycles and 240 cycles per second and higher harmonics of the fundamental frequency. The inductor 30 provides a path for the direct component of the rectified load current. The inductor 30, condenser 31 and inductor 32 may be tuned to parallel resonance at 120 cycles for example, so that the series impedance of filter 21 has a high inductive reactance at this frequency. Inductor 32 and condenser 31 are tuned to series resonance at a frequency intermediate the 120-cycle and 240-cycle components, say at 170 cycles per second. Then, at a frequency of 240 cycles per second the series impedance of filter 21 will also have a high inductive reactance but not as high as its reactance at 120 cycles per second. The capacitances of condensers 27, 28 and 31 may be 6250 microfarads, 0.05 microfarad and 10 microfarads, respectively, for example.

For supplying current to the bias winding 23, there is connected across the load a current path comprising biasing winding 23, resistor 33, potentiometer 34 and resistor 35, all in series. The magnetomotive force set up in the cores 25 and 26 due to the current in bias winding 23 is opposed to the magnetomotive forces set up in cores 25 and 26, respectively, due to the rectified current flowing through impedance windings 13 and 14, respectively. The resistance path 33, 34 and 35 also serves as a bleeder resistor across the output of rectifier 16. Moreover, harmonic currents resulting from voltages induced in bias winding 23 can flow through the path 33, 34 and 35. These currents aid greatly in maintaining a balance between the unidirectional currents flowing through the impedance windings 13 and 14. A rectifying element 36 is connected across the output terminals of rectifier 16. A current path comprising a 0.5 microfarad condenser 37 and a resistor 38, in series, is connected from a common terminal of winding 13 and rectifier element 17 to a common terminal of winding 14 and rectifier element 19.

During each half-cycle period of one polarity of the current from the supply source 10, current is supplied from the secondary of transformer 12 to a circuit comprising winding 13, rectifier element 17, load 11 shunted by condenser 27, the series impedance of filter 21 and rectifier element 20, all in series. During each half-cycle period of opposite polarity, current is supplied from transformer winding 12 through a circuit comprising rectifier element 18, load 11 shunted by condenser 27, the series impedance of filter 21, rectifier element 19 and winding 14, all in series. If the load circuit were resistive, there would be produced in the load circuit during successive half-cycle periods unidirectional current pulses separated by zero current commutating intervals recurring when the polarity of the supply voltage changes. However, the inductive reactance of the filter impedance 28, 29, 30, 31 and 32 tends to hold the load current constant irrespective of the cyclic variations of the voltage delivered by the self-saturating reactor-rectifier 15, 16. It is desirable, in order to avoid loss of control sensitivity, to permit the currents in impedance windings 13 and 14 to fall to zero during the commutating intervals. During each commutating interval, most of the current in the load circuit will flow through the rectifier element 36 and some of the load current may also flow through the rectifier elements 20 and 18 in series. Therefore, during the commutating interval the portion of the load current flowing in the path comprising rectifier elements 17 and 19 and windings 13 and 14, all in series, is negligibly small.

There is connected across the load 11 a circuit comprising constant voltage tubes 40 and 41 for setting up a substantially constant reference voltage across a resistor 42 having a resistance of 10,000 ohms, for example. The anode-cathode paths of tubes 40 and 41 are in parallel, the anodes of the tubes being connected through resistors 43 and 44 of 500 ohms and 6700 ohms, respectively, in series, to the positive load terminal and the cathodes of the tubes being directly, conductively connected to the negative load terminal. A starting electrode of tube 40 is connected through a 250,000-ohm resistor 45 to the positive load terminal. A starting electrode of tube 41 is connected through 10,000-ohm resistor 46 and 100,000-ohm resistor 47 to the common terminal of resistors 43 and 44. The common terminal of resistors 46 and 47 is connected through a condenser 48 of 0.25 microfarad to the cathodes of tubes 40 and 41. A current path comprising a rectifier element 49 and resistor 42 in series is connected across the anode-cathode paths of tubes 40 and 41. With the circuit shown, current conduction will start in tube 40. Tube 41 is a spare and it will condut space current only if the tube 40 should fail. The varistor or rectifying element 49 is poled so that its resistance is low to current flowing in the direction from the anode through resistor 42 to the cathode of tube 40.

There is provided a magnetic amplifier 50 comprising impedance windings 51 and 52, a control winding 53 and a rectifier 54 comprising rectifier elements 55, 56, 57 and 58. The magnetic amplifier 50 is somewhat similar to the magnetic amplifier which comprises saturable reactor 15 and rectifier 16. The windings 51 and 52 may be mounted on cores similarly to windings 13 and 14 of Fig. 5 or they may be mounted on the outer legs, respectively, of a three-legged core. The control winding 53 may be mounted as is the control winding 22 of Fig. 5. Current is supplied to magnetic amplifier 50 from the output of a line compensating circuit 59 to which current is supplied from the alternating-current supply source 10. The line compensating circuit 59 may be of the type shown in Fig. 3 or of the type shown in Fig. 4. As will later be explained in connection with Figs. 3 and 4, the output voltage of the line compensator 59 decreases in response to an increase of line voltage and vice versa. The output current of the magnetic amplifier 50 is supplied to the control winding 22 of saturable reactor 15. During a half-cycle period of one polarity of the voltage source 10, current flows from the output of the line compensator 59 through a circuit comprising winding 51, rectifier element 55, control winding 22 and rectifier element 58, all in series. During a half-cycle period of opposite polarity, current from the line compensator 59 will flow through a circuit comprising rectifier element 56, control winding 22, rectifier element 57 and winding 52, all in series.

Figure 6:
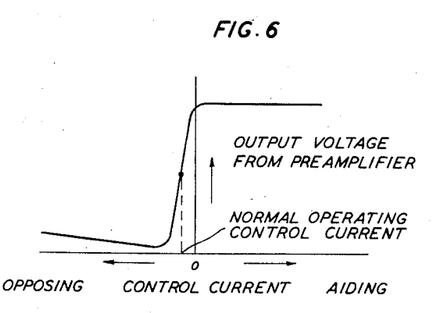
Fig. 6 is a diagram to which reference will be made in describing the operation of the invention.

The circuit for energizing the control winding 53 of magnetic amplifier 50 may be traced from the negative load terminal, through a circuit comprising resistor 35, a portion of the resistance of potentiometer 34 to point $a$, stabilizing winding 24, control winding 53 and a harmonic suppression choke 60 to point $b$ and through resistor 42 back to the negative load terminal. Under normal operating conditions, the control current for the magnetic amplifier 50 will be quite small and the magnetomotive force produced by the current supplied to control winding 53 will be just sufficient to offset the magnetomotive force due to the flow of magnetizing current in the impedance windings 51 and 52, thereby biasing the magnetic amplifier to the high gain portion of its characteristic curve shown in Fig. 6. This curve shows the control current supplied to control winding 53 as the abscissa and the output voltage of the magnetic amplifier 50 as the ordinate, the normal operating control current being indicated by the vertical dash line. To obtain this "normal" value of control current, the potential of point a will be just slightly positive with respect to the potential of point b. When the control current is small, the voltage across resistor 42 is substantially constant and slightly less than the voltage across the constant voltage tube 40. The voltage across resistor 35 and a portion of potentiometer 34 is proportional to the load voltage. This constant voltage and the voltage proportional to the load voltage are opposed in the control circuit for energizing the control winding 53. A third voltage component in the control circuit of winding 53 is a transient voltage which may be induced in winding 24, as will be explained below. The load voltage may be increased or decreased by adjusting the movable contact of potentiometer 34. Referring to Fig. 6, it is seen that the control current may be considered as being negative or less than zero in the normal operating region where the magnetomotive force due to the current in control winding 53 opposes the magnetomotive forces due to the currents in windings 51 and 52.

If the load voltage should decrease below the predetermined normal value, the current supplied to control winding 53 will decrease, that is, become less negative. In extreme cases the control current may reverse and become positive, causing the output of magnetic amplifier 50 to increase to maximum value. The increase of current supplied from magnetic amplifier 50 to the control winding 22 in response to a decrease of load voltage will increase the saturation of the core or cores of reactor 15 which, aided by the increased self-saturating action, will reduce the impedance of impedance windings 13 and 14 to thereby minimize the assumed decrease of load voltage. An increase of load voltage, on the other hand, will cause the control current supplied to winding 53 to increase in the negative direction, as shown in Fig. 6. As a result the output of magnetic amplifier 50 supplied to control winding 22 will decrease to cause an increase of the impedance of impedance windings 13 and 14, thereby minimizing the assumed increase of load voltage. If the load voltage should rise abruptly due to disconnecting the entire load or to a sudden abnormal rise of the supply voltage 10, the negative current through the control winding 53 will rise. However, this increase of control current will be opposed by the increased voltage drop across resistor 42 after the current in varistor 49 falls to zero, thus limiting the increase of current in winding 53. Moreover, if the regulator tube should be removed from its socket when the circuit is in operation, the resistor 42 will permit sufficient current to flow through the control winding 53 to reduce the load voltage to a minimum obtainable value.

An increase of saturating flux in the core of saturable reactor 15 will cause a voltage to be induced in the stabilizing winding 24. This induced voltage will be in a direction to increase the current in the control winding 53 in the negative direction, as shown in Fig. 6. The resulting reduction of the output of magnetic amplifier 50 and of the current supplied to control winding 22 causes the assumed change of flux to be opposed. Thus this feedback through the stabilizing winding 24 of saturable reactor 15 to the control winding of magnetic amplifier 50 functions to slow down flux changes in the saturable reactor 15 without in any way detracting from the steady state performance of the regulating system. An incremental increase of control current results in an incremental increase of average output voltage of the magnetic amplifier 50. This increase of output voltage is stepped up by transformer action between windings 22 and 24 in the ratio of 500 to 25 to give the voltage induced in the stabilizing winding 24. A small change of current in the control winding 53 can thus produce a rather large voltage at the terminals of the stabilizing winding 24 due to the large gain in the magnetic amplifier 50 and the voltage step up between windings 22 and 24 of the saturable reactor. This voltage induced in the stabilizing winding 24, with the phasing specified, has the effect of a resistance of rather high value in the control circuit under dynamic conditions while under static conditions the control circuit is unaffected.

It will be noted that an increase of voltage of the supply source 10 applied to the circuit of saturable reactor 15 will increase the average output or load voltage until the saturation flux level in saturable reactor 15 has been corrected. If the magnetic amplifier 50 were energized directly from the supply source 10, the output of the magnetic amplifier 50 would likewise increase in response to an increase of line voltage. The increase of output of the magnetic amplifier 50 would increase the saturation level in the saturable reactor 15 to thereby still further increase the output or load voltage. There is provided, therefore, a line compensator 59, shown in detail in Fig. 3 or Fig. 4, for compensating for changes in line voltage. The output voltage of the line compensator 59 decreases in response to an increase of line voltage and vice versa. Since the power requirements of the magnetic amplifier 50 are relatively small, the line voltage compensation can be achieved most economically by supplying the output of the line compensator to the magnetic amplifier 50 rather than to the magnetic amplifier circuit which comprises saturable reactor 15 and rectifier 16.

Figure 3:
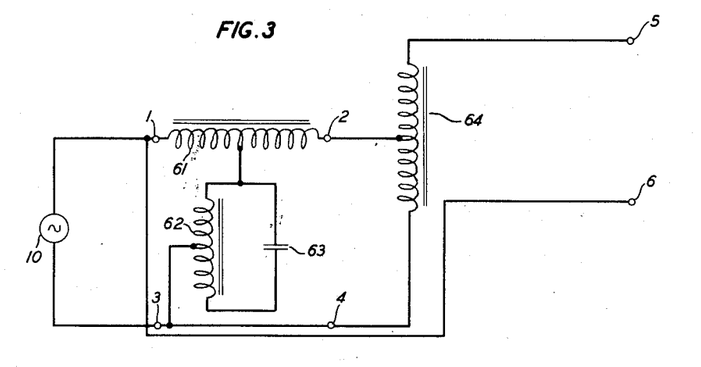
Figs. 3 and 4 are schematic views of line voltage compensating circuits which may be used in the current supply circuits of Figs. 1 and 2.

Referring to Fig. 3, there is provided a linear reactor 61 connected between a terminal 1 and a terminal 2. There are also provided a saturable reactor 62 and a capacitor 63 connected in parallel. A common terminal of reactor 62 and condenser 63 is connected to reactor 61 at a point between the terminals 1 and 2. Terminals 3 and 4 are conductively connected to reactor 62 at a point between its end terminals. Terminals 1 and 3 are input terminals connected to an alternating-current supply source 10, as indicated also in Fig. 1. The circuit as thus far described provides a voltage at terminals 2 and 4 which remains substantially constant irrespective of voltage fluctuations of the supply source 10. This portion of the compensating circuit is similar to the circuit disclosed in "Elektrotechnische Zietschrift," page 489 et seq., April 30, 1936, for example. The terminals 2 and 4 are connected across a portion of the winding or primary of a step-up autotransformer 64. The entire winding or secondary of autotransformer 64 is connected between terminal 4 and an output terminal 5. The voltage across the secondary of autotransformer 64 is thus a substantially constant alternating voltage larger than the voltage of the supply source 10. Because of its large energy storage, this circuit has the property that sudden changes of supply voltage produce very little effect upon the voltage across terminals 2 and 4 or the voltage across terminals 4 and 5.

Input terminal 1 is conductively connected to output terminal 6. It will be seen that the output voltage across terminals 5 and 6 is equal to the relatively constant alternating voltage across the secondary of autotransformer 64 minus the voltage of the supply source 10. The output voltage at terminals 5 and 6 thus decreases in response to an increase of voltage of source 10 and vice versa. If desired, of course, a portion only of the supply voltage 10 could be subtracted from the voltage across the secondary of autotransformer 64. The magnitude of the voltage decrease at the output terminals 5 and 6 of the compensator for a given increase of line voltage may thus be adjusted. The voltage change at the output terminals 5, 6 is substantially independent of the magnitude of the substantially constant voltage across terminals 2 and 4 or that across terminals 4 and 5. Supplying the voltage from the output of the compensating circuit 59 to the magnetic amplifier 50, instead of the voltage of the supply source 10, has the effect of immediately and strongly reducing the control current supplied to control winding 22, thereby lowering the flux saturation level of saturable reactor 15 to compensate for the effect of an increase in the supply voltage upon the load voltage.

It was found that, without the compensator 59, a step increase of line voltage of seven percent of the normal voltage of source 10 produced approximately a nine percent instantaneous increase of load voltage. With the compensator 59 in circuit, it was found that the instantaneous deviations in the output voltage from the normal output voltage could be kept well within ± one percent for the seven percent step increase of line voltage for a load range from zero load current to full load.

Figure 4:
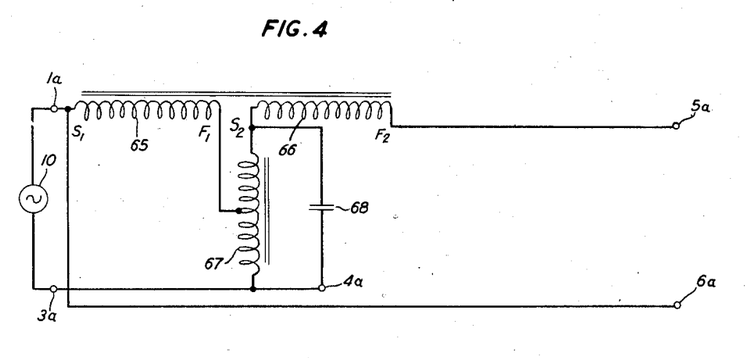

If desired the compensating circuit of Fig. 3 may be modified to incorporate the step-up autotransformer into the constant voltage regulating circuit so that a separate autotransformer need not be employed. Such a modified arrangement is shown in Fig. 4. In Fig. 4, there are provided a linear reactor having a winding 65, a second linear reactor having a winding 66, a saturable reactor 67 and a condenser 68. Preferably the windings 65 and 66 are similarly wound on a common core from start terminals S1 and S2, respectively, to finish terminals F1 and F2, respectively. Condenser 68 is connected across saturable reactor 67. The input circuit connected to the alternating-current supply source 10 may be traced from terminal 1a through a circuit comprising winding 65 and a portion of winding 67 to input terminal 3a. A substantially constant alternating a voltage is set up across terminals 4a and 5a, the current path connecting these terminals comprising the entire winding 67, shunted by condenser 68 and the winding 66 in series. The voltage across terminals 4a and 5a is larger than the line voltage of source 10 because of the step-up transformer action in the saturable reactor 67, this saturable reactor performing the functions of the saturable reactor 62 and of the autotransformer 64 of Fig. 3. The voltage of the supply source 10 is subtracted from a stepped-up, substantially constant alternating voltage across terminals 4a, 5a, to produce across terminals 5a, 6a a voltage which decreases in response to an increase of line voltage and vice versa, the terminal 6a being conductively connected to input terminal 1a.

Figure 2:
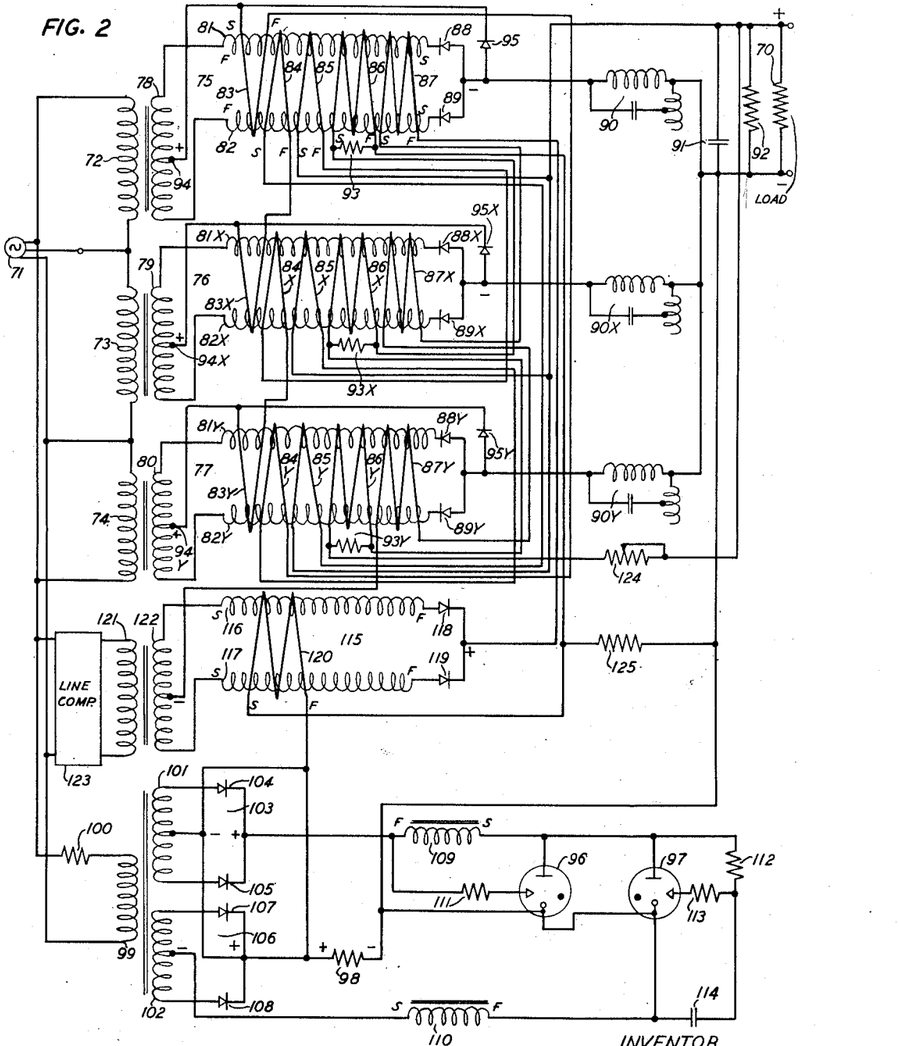
Fig. 2 is a schematic view of a current supply apparatus which is a modification of the apparatus shown in Fig. 1.

Fig. 2 shows a system for supplying to a load 70 a regulated, rectified alternating current from a three-phase alternating-current source 71. There are provided three transformers having primaries 72, 73, 74, respectively, delta connected to the alternating-current source 71. There are provided three similar reactor-rectifiers or magnetic amplifiers 75, 76 and 77 having their inputs connected to the secondary windings 78, 79 and 80 of the transformers having primaries 72, 73 and 74, respectively. Saturable reactor-rectifier 75 comprises two impedance windings 81 and 82, three balancing windings 83, 84 and 85, a bias and stabilizing winding 86 and a control winding 87. The windings are wound from start "S" to finish "F" in the manner shown in Fig. 5, windings 81 and 82 being mounted on different cores, respectively, or on the outer legs of a three-legged core and the remaining windings being mounted on both cores or on the middle leg of the three-legged core. Windings 83, 84, 85, 86 and 87 may have two turns, one turn, one turn, 400 turns and 100 turns, respectively, for example. The current supplied to the load circuit through windings 81 and 82 is rectified by the rectifier elements 88 and 89. The common terminals of rectifier elements 88 and 89 is connected through the series impedance 90, similar to the series impedance of filter 21 of Fig. 1, to the negative load terminal. A condenser 91 of 30,000 microfarads and a bleeder resistor 92 of ten ohms are each connected across the load 70. A resistor 93 is connected across the winding 86. A center tap 94 of transformer winding 78 is the positive output terminal of the saturable reactor-rectifier 75. Its negative output terminal is the common terminal of rectifier elements 88 and 89. A rectifier element 95 in a path connecting the negative and positive output terminals is provided for the same purpose as the rectifier element 36 of Fig. 1.

The circuit associated with the secondary transformer winding 79 is like the circuit associated with the secondary transformer winding 78 as described above and the circuit components are identified by the same numerals followed by the letter x. The circuit associated with secondary transformer winding 80 is also like the circuit associated with secondary transformer winding 78, the circuit components being identified by the same numerals followed by the letter y. There are provided three current paths connecting the positive output terminals 94, 94x and 94y, respectively, to the positive load terminal. One of the paths comprises windings 83, 84y, and 85x, all in series, a second of the paths comprises windings 83x, 84 and 85y, all in series, and the third path comprises windings 83y, 84x and 85, all in series. During half-cycle periods of one polarity of the current supplied from transformer secondary 78, current flows through rectifier element 88 and winding 81 and during half-cycle periods of opposite polarity the current flows through rectifier element 89 and winding 82. So also the current pulses flow through the path 88x, 81x and the path 89x, 82x alternately and through the path 88y, 81y and the path 89y and 82y alternately.

There is provided a circuit comprising constant voltage tubes 96 and 97 which when energized sets up a substantially constant reference voltage across resistor 98. There is provided a transformer having a primary winding 99 connected through a resistor 100 to one phase of the three-phase current supply source 71, the transformer having two secondary windings 101 and 102. There is provided a rectifier 103 comprising secondary winding 101 and two rectifier elements 104 and 105. The common terminal of rectifier elements 104 and 105 is the positive output terminal of the rectifier 103 and a mid-terminal of winding 101 is its negative output terminal. A second rectifier 106 comprises secondary winding 102 and two rectifier elements 107 and 108, the common terminal of rectifier elements 107 and 108 being its positive output terminal and a mid-terminal of winding 102 being its negative output terminal. The negative output terminal of rectifier element 103 and a positive output terminal of rectifier 106 are conductively connected. The anodes of tubes 96 and 97 are conductively connected and the cathodes of tubes 96 and 97 are conductively connected. The sum of the output voltages of rectifiers 103 and 106 is impressed upon a circuit for energizing tubes 96 and 97. This circuit may be traced from the positive output terminal of rectifier 103 through a reactor winding 109, the anode-cathode paths of tubes 96 and 97 in parallel and reactor winding 110, in series to the negative output terminal of rectifier 106. Windings 109 and 110 are similarly wound upon a common core in the direction from start terminal "S" to finish terminal "F" as indicated in the drawing. The positive output terminal of rectifier 103 is connected through a 100,000-ohm resistor 111 to a starting electrode of tube 96. The positive output terminal of rectifier 103 is connected through reactor winding 109 and through a 100,000-ohm resistor 112 and a 10,000-ohm resistor 113 in series to a starting electrode of tube 97. A 0.25 microfarad condenser 114 is connected from a common terminal of resistors 112 and 113 to the cathode of tube 97. As in the embodiment of Fig. 1, tube 97 is a spare and it will be energized only if tube 96 fails to function. The common output terminal of rectifiers 103 and 106 is at a higher potential than the cathode of tube 96. The direction of the current flow through resistor 98 is, therefore, from the positive output terminal of rectifier 106 to the cathode of tube 96.

There is also provided a magnetic amplifier 115 comprising impedance windings 116 and 117, rectifier elements 118 and 119 and a control winding 120. The windings 116, 117 and 120 are mounted on a core or cores as described in connection with Fig. 1. There is provided a transformer having a primary winding 121 and a secondary winding 122. The primary 121 is supplied through a line compensator 123 with current from one phase of the supply source 71, preferably the phase which also supplies current to winding 99.

A circuit may be traced from the positive load terminal through a rheostat 124, the biasing and stabilizing windings 86y, 86x and 86, in series, control winding 120 of magnetic amplifier 115 and through resistor 98 to the negative load terminal. This circuit causes to be impressed upon the control winding 120 a voltage substantially equal to the difference of the load voltage and a substantially constant reference voltage across resistor 98. In addition there is impressed upon the control winding 120 a transient voltage induced in windings 86y, 86x and 86 in response to a change of saturating flux in the cores of saturable reactors 75, 76 and 77. A bias current is supplied from the load circuit through rheostat 124, windings 86y, 86x and 86 and a resistor 125. The output current of magnetic amplifier 115 is supplied to control windings 87y, 87x and 87 in series.

The current supply circuit of Fig. 2 operates similarly to the current supply circuit of Fig. 1. Fig. 2 differs from Fig. 1 in that three saturable reactor-rectifiers 75, 76 and 77 supply current through individual filter reactors 90, 90x and 90y to a common output capacitor 91 and load 70. A single magnetic amplifier 115 is provided for supplying control current to the three saturable reactors 75, 76 and 77. This arrangement, of course, is less expensive than that of providing three magnetic amplifiers for controlling the three saturable reactors, respectively.

The current path connecting the positive output terminal 94 of saturable reactor-rectifier 75 to the positive load terminal comprises in series windings 83, 84y and 85x. A similar path connecting output terminal 94x to the positive load terminal comprises in series windings 83x, 84 and 85y. A third path connecting positive output terminal 94y to the positive load terminal comprises in series windings 83y, 84x and 85. Each of windings 83, 83x and 83y has two turns and each of the remaining windings 84, 84x, 84y, 85, 85x and 85y has one turn. The magnetomotive force due to winding 83 is opposing and the magnetomotive force due to windings 84 and 85 are aiding with respect to the magnetomotive force due to windings 81 and 82. The magnetomotive force due to winding 83x is opposing and the magnetomotive force due to windings 84x and 85x are aiding with respect to the magnetomotive force due to windings 81x and 82x. The magnetomotive force due to winding 83y is opposing and the magnetomotive force due to windings 84x and 85x are aiding with respect to the magnetomotive force due to the windings of 81y and 82y. There thus appears on each reactor control leg a two-turn winding carrying the output current from the reactor opposing the self-saturation and two one-turn windings each carrying the output current from a reactor in one of the other phases aiding the self-saturation. With perfect balance in the currents delivered by the three reactors, respectively, to the load, the average net magnetomotive force from these three windings would be zero. Any unbalance of the currents delivered by the three reactors, respectively, will introduce a magnetomotive force which will oppose the saturation in the reactor carrying the larger current and which will aid the self-saturating action in the reactor carrying the smaller current. This arrangement of windings was found to be very effective in maintaining uniform distribution between the rectifiers in the individual phases even under conditions of bad line voltage unbalance.

The resistors 93, 93x and 93y across the stabilizing windings 86, 86x and 86y are for the purpose of preventing the saturation flux level in each of the reactors from changing so rapidly that one of the two impedance windings passes a large current while the other passes a relatively small current, for example. Such an operating mode would not only unbalance the average current loadings on the rectifier elements but would also result in a high amplitude third harmonic ripple voltage appearing on the output of the saturable reactor-rectifier. The action of resistors 93, 93x and 93y in providing current paths for harmonic currents induced in windings 86, 86x and 86y, respectively, limits the amplitude of the induced voltages. Therefore, the addition of a harmonic suppression choke, like the choke 60 provided in Fig. 1, in series with the control winding 120 of magnetic amplifier 115 is made unnecessary.

Figure 7:
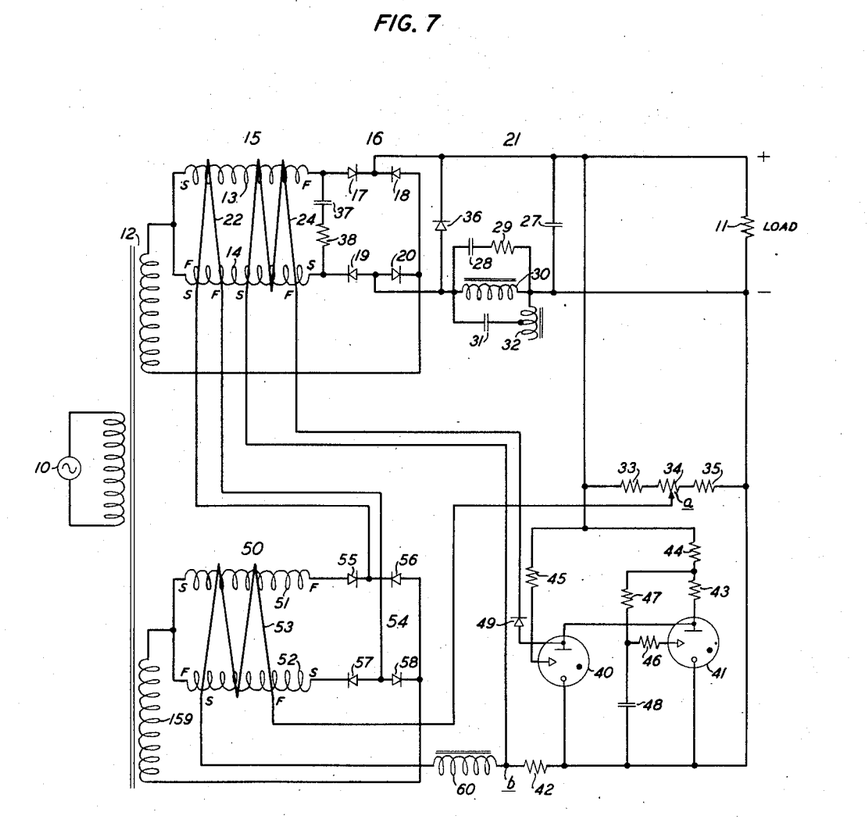
Fig. 7 is a schematic view of a current supply apparatus which is another modification of the apparatus shown in Fig. 1.

Fig. 7 shows a modification of the current supply circuit shown in Fig. 1 and, to avoid repetition, the same designations are used for the corresponding parts in both figures. Fig. 7 differs from Fig. 1 in the following respects:

The line compensating circuit 59 of Fig. 1 is not required in the embodiment of the invention shown in Fig. 7. Instead, transformer 12 is provided with an additional secondary winding 159, one terminal of this secondary winding being connected to the common terminal of impedance windings 51 and 52 of magnetic amplifier 50 and the other terminal of winding 159 being connected to the common terminal of rectifier elements 56 and 58.

Instead of using the separate biasing and stabilizing windings 23 and 24, respectively, of Fig. 1, a single winding 24 is provided in Fig. 7 for performing both the biasing and stabilizing functions. Whereas in Fig. 1 the magnetomotive force due to the current supplied to biasing winding 23 opposes the magnetomotive force due to the current in impedance windings 13 and 14, in Fig. 7 the magnetomotive force due to the biasing current supplied to the bias-stabilizing winding 24 aids the magnetomotive force due to the currents supplied to windings 13 and 14. The biasing current for winding 24 is set up by impressing the substantially constant voltage across the constant voltage tube 40 upon a circuit comprising rectifying diode 49, the winding 24 and resistor 42, all in series. In Fig. 7, current from rectifier 54 flows into the S terminal and out of the F terminal of control winding 22 whereas in Fig. 1 the current flows into the F terminal and out of the S terminal of control winding 22.

Since the separate biasing winding 23 of Fig. 1 is not used in Fig. 7, the voltage divider comprising resistor 33, potentiometer 34 and resistor 35, all in series, is connected directly across the load 11. The point *a* which is the variable tap of potentiometer 34 has a slightly positive potential with respect to the potential of point *b* which is the common terminal of inductor 60 and resistor 42. That is, the voltage drop across resistor 35 and a portion of potentiometer 34 is larger than the opposing voltage drop across resistor 42 in the series circuit comprising resistor 35, a portion of potentiometer 34, control winding 53 of magnetic amplifier 50, inductor 60 and resistor 42. The current flows into terminal F and out of terminal S of control winding 53 in Fig. 7 while in Fig. 1 the current flows into terminal S and out of terminal F of winding 53.

It is thus seen that in Fig. 7 the current supplied to the bias-stabilizing winding 24 is in a direction to bias the saturable reactor 15 in the positive sense, that is, in a direction to aid the self-saturating action of the impedance windings 13 and 14, and the current supplied to the control winding 22 is in a direction to oppose the self-saturation. The control winding 53 of the magnetic amplifier 50 is connected so that an increase of control current in this winding due to an increase of load voltage will be in the positive sense, that is, in a direction to aid the self-saturating action of the impedance windings 51 and 52. Thus an increase of load voltage, for example, will cause an increase of the output current of rectifier 54 which is supplied to the control winding 22 of saturable reactor 15. The increased current supplied to control winding 22 reduces the center leg flux of the reactor 15 to cause the impedance of windings 13 and 14 to increase, thereby minimizing the assumed increase of load voltage.

When the flux in the center leg of saturable reactor 15 is increasing with time, for example, there will be induced in the bias-stabilizing winding 24 a voltage which would make the F terminal positive and the S terminal negative. Since the voltage across the path comprising diode 49, winding 24 and resistor 42, all in series, is substantially constant due to the action of the voltage regulating tube 40 connected across this path, the increase of voltage across winding 24 causes a reduction of voltage drop across resistor 42. As a result, there is a transient decrease of potential of point $b$ with respect to the potential of point $a$. Increased current thus flows from the positive load terminal, through resistor 33 and a portion of potentiometer 34 to point $a$, through control winding 53 from terminal F to terminal S, through inductor 60 to point $b$ and thence through resistor 42 to the negative load terminal. The output of magnetic amplifier 50 supplied to control winding 22 of magnetic amplifier 15, 16 thus increases to cause a reduction of flux in the center leg of saturable reactor 15. The initially assumed change of flux in the core of saturable reactor 15 is thus opposed. Therefore, the voltage induced in the bias-stabilizing winding 24 due to changing flux in the core of saturable reactor 15 functions to slow down the flux changes and thus prevent overshooting of the load voltage or "hunting."

The line compensating circuit 59 of Fig. 1 is not required in Fig. 7 for the following reasons. A sudden increase of the line voltage from source 10, for example, causes the output voltages of magnetic amplifier 15, 16 and of magnetic amplifier 50, 54 to rise. However, the rise of output current of magnetic amplifier 50, 54 supplied to control winding 22 will cause the flux in the center leg of saturable reactor 15 to decrease with time at a rate which will be dependent upon the number of turns in the control winding 22. The number of turns of control winding 22 may be selected so as to rapidly compensate for an increase or decrease of line voltage to minimize the effect of a line voltage change upon the output voltage of magnetic amplifier 15, 16.

It has been found from theoretical considerations and from experimental data that certain relationships should preferably be satisfied to obtain optimum results in practicing the invention. A first of these relationships is for achieving line compensation in circuits such as shown in Figs. 1 and 2 in which line compensating networks 59 and 123, respectively, are employed. This relationship is as follows:

$$\frac{N_1 N_p}{N_2 N_s} > \frac{\Delta E_1}{\Delta E_2} \geq \frac{N_1 N_p}{N_2 N_s}\left[1 - \frac{N_c N_p}{2\pi N_2 N_s}\left(1 - \epsilon^{-\frac{2\pi N_2 N_s}{N_c N_p}}\right)\right]$$

The second similar relationship which is applicable to circuits such as shown in Fig. 7 in which no line compensating network is used is as follows:

$$\frac{N_1 N_p}{N_2 N_s} > \frac{E_1}{E_2} \geq \frac{N_1 N_p}{N_2 N_s}\left[1 - \frac{N_c N_p}{2\pi N_2 N_s}\left(1 - \epsilon^{-\frac{2\pi N_2 N_s}{N_c N_p}}\right)\right]$$

In these formulae, $N_1$=number of turns in gate winding such as 13 or 81.
$N_2$=number of turns in gate winding such as 51 or 116.
$N_s$=number of turns in stabilizing winding 24 in Figs. 1 and 7 or the sum of the turns in windings 86, 86x and 86y in Fig. 2.
$N_p$=number of turns in control winding 53 or 120.
$N_c$=number of turns in control winding 22 in Figs. 1 and 7 or the sum of the turns in windings 87, 87x and 87y in Fig. 2.
$E_1$=root-mean-square voltage across secondary of transformer 12 in Figs. 1 and 7 or one-half the root-mean-square voltage across the secondary winding 78 in Fig. 2.
$\Delta E_1$=the variational component of $E_1$.
$E_2$=root-mean-square voltage across output of line compensator 59 in Fig. 1 or that across transformer winding 159 in Fig. 7 or that across one-half transformer winding 122 in Fig. 2.
$\Delta E_2$=the variational component of $E_2$.
$\pi$=3.1416.
$\epsilon$=2.7183.
$>$ means greater than.
$\geq$ means greater than or equal to.

The third relationship for achieving stabilization is as follows:

$$N_s = 1.5\left[2\frac{R_1}{R_1+R_2}N_1 + \frac{1}{2}\frac{N_c N_p}{N_2}\right]$$

In this formula, the symbols $N_s$, $N_1$, $N_c$, $N_p$, and $N_2$ have the meanings given to them above and $R_1$=resistance between negative load terminal and point $a$ on voltage divider 33, 34, 35 in Figs. 1 and 7.
$R_2$=resistance between positive load terminal and point $a$ on voltage divider 33, 34, 35 in Figs. 1 and 7.

In Fig. 2, $R_1$=resistance of resistor 125.
$R_2$=resistance of rheostat 124.

In an experimental circuit similar to the one shown in Fig. 7, for example, excellent results were obtained by employing the following values.

$N_1$ = 765 turns
$N_2$ = 1080 turns
$N_s$ = 550 turns
$N_p$ = 2508 turns
$N_c$ = 35 turns
$E_1$ = 257.2 volts
$E_2$ = 80 volts $$\frac{R_1}{R_1+R_2} = 0.10647$$

When using the third of the above formulae, the calculated value of $N_s$ is approximately 305 turns whereas the value for $N_s$ used in the experimental circuit was 550 turns. The fact that the experimental results were excellent indicates that the values derived from the formulae need not in all cases be rigidly adhered to in order to obtain satisfactory results.

What is claimed is:

1. Apparatus comprising rectifying means for supplying rectified current from an alternating-current supply source to a load circuit including a load, said apparatus comprising a saturable reactor having an impedance winding in a path for supplying said rectified current to said load circuit and having a plurality of windings to which currents are supplied for controlling the impedance of said impedance winding, one of said plurality of windings being a stabilizing winding and another of said plurality of windings being a first control winding, the number of turns of said stabilizing winding being several times at least the number of turns of said first control winding, a magnetic amplifier for supplying current from its output to said first control winding, said magnetic amplifier having a second impedance winding and a second control winding, and means for impressing upon a circuit comprising said stabilizing winding and said second control winding in series a voltage having variations corresponding to load voltage changes.

2. Apparatus comprising rectifying means for supplying rectified current from an alternating-current supply source to a load circuit including a load, said apparatus comprising a saturable reactor having a first impedance winding in a path for supplying said rectified current to said load circuit and having a first control winding, a magnetic amplifier having a second impedance winding and a second control winding, means for deriving from said supply source an alternating voltage which decreases in response to a voltage increase of said supply source and vice versa, means for impressing said derived voltage upon a series circuit comprising said second impedance winding and said first control winding, and means for supplying to said second control winding a current for controlling the impedance of said second impedance winding.

3. Apparatus comprising rectifying means for supplying rectified current from an alternating-current supply source to a load circuit including a load, said apparatus comprising a saturable reactor having a first impedance winding in a path for supplying said rectified current to said load circuit, said saturable reactor also having a stabilizing winding and a first control winding, the relative turns of said windings producing a voltage step up from said first control winding to said stabilizing winding, a magnetic amplifier for supplying current from its output to said first control winding, said magnetic amplifier having a second impedance winding and a second control winding, a current path comprising said stabilizing winding and said second control winding in series, and means for deriving from said load circuit and impressing upon said current path a control current which varies in response to load voltage changes.

4. In combination, a first and a second magnetic amplifier each having an input, an output, and a plurality of windings including a control winding, means for supplying current from an alternating-current supply source to the input of said first magnetic amplifier, means for supplying current from the output of said first magnetic amplifier to a load, means for deriving from said supply source and impressing upon the input of said second magnetic amplifier an alternating voltage which decreases in response to a voltage increase of said supply source and vice versa, means for supplying to the control winding of said second magnetic amplifier a current for controlling the output current of said second magnetic amplifier, and means for supplying output current from said second magnetic amplifier to the control winding of said first magnetic amplifier.

5. Apparatus for controlling the supply of current to a load comprising a first and a second saturable reactor, said first saturable reactor comprising a first impedance winding and a plurality of control windings including a first and a second control winding for controlling the impedance of said first impedance winding, said second saturable reactor comprising a second impedance winding and a plurality of control windings including a third and a fourth control winding for controlling the impedance of said second impedance winding, means for supplying current to a load through each of a plurality of circuits including a first and a second circuit, said first circuit comprising said first impedance winding and said first and third control windings, all in series, said second circuit comprising said second impedance winding and said second and fourth control windings, all in series, the resultant magnetomotive force set up by said control windings for said first saturable reactor and the resultant magnetomotive force set up by said control windings for said second saturable reactor each being equal to substantially zero when the currents in said first and second circuits, respectively, are substantially equal.

6. Apparatus for supplying current from a three-phase current supply source to a load comprising a first, a second, and a third saturable reactor each having a plurality of windings comprising an impedance winding and a first, a second and a third winding, said first winding having twice as many turns as each of said second and third windings, a first circuit for supplying current from a first of said phases to said load comprising in series said impedance winding and first winding of said first reactor, the second winding of said third reactor and the third winding of said second reactor, a second circuit for supplying current from a second of said phases to said load comprising in series the impedance winding and first winding of said second reactor, the second winding of said first reactor and the third winding of said third reactor, and a third circuit for supplying current from the third phase to said load comprising in series the impedance winding and first winding of said third reactor, the second winding of said second reactor and the third winding of said first reactor.

7. Apparatus in accordance with claim 6 in which said plurality of windings comprises a fourth winding and in which there is provided a magnetic amplifier having an output circuit coupled to the fourth winding of each of said first, second, and third saturable reactors all connected in series.

8. Apparatus in accordance with claim 7 in which said plurality of windings comprises a fifth winding having a larger number of turns than the turns of said fourth winding, in which said magnetic amplifier has a control winding and in which a current for regulating the load current is supplied to a circuit comprising said control winding and the fifth winding of each of said first, second and third saturable reactors all in series.

9. In combination a first and second magnetic amplifier, said first magnetic amplifier comprising a first magnetic circuit and a first, a second and a third winding for said first magnetic circuit, a second magnetic amplifier comprising a second magnetic circuit and a fourth and a fifth winding for said second magnetic circuit, means for supplying rectified current from an alternating-current supply source through said first winding to a load, means for supplying unidirectional biasing current to said second winding, the currents supplied to said first and second windings setting up aiding magnetomotive forces in said first magnetic circuit, means for supplying rectified current from said alternating-current supply source through said fourth winding and said third winding in series, the current in said third winding setting up in said first magnetic circuit a magnetomotive force which opposes the magnetomotive forces due to said first and second windings, and means for deriving from said load circuit and supplying to said fifth winding a current for setting up in said second magnetic circuit a magnetomotive force which aids the magnetomotive force set up therein due to the current in said fourth winding.

10. A combination in accordance with claim 9 in which means are provided for transiently increasing the current supplied to said fifth winding in response to an increase a flux in said first magnetic circuit and vice versa, thereby decreasing the rate of change in flux in said first magnetic circuit.

11. A combination in accordance with claim 10 in which there are provided a first current path connected across said load comprising resistance and a constant voltage device in series, a second current path connected across said constant voltage device comprising in series said second winding and a resistor, a voltage divider having end terminals connected to the terminals of the load, respectively, and having a terminal intermediate its end terminals, and a current path comprising said fifth winding connecting said intermediate terminal to the common terminal of said second winding and said resistor.

12. An amplifier comprising a first stage self-saturating magnetic amplifier and a second stage self-saturating magnetic amplifier, means for energizing each of said magnetic amplifiers by current from an alternating-current supply source the voltage of which may vary, an increase of said alternating voltage causing the output of each of said magnetic amplifiers to increase and vice versa, said first and second magnetic amplifiers having a first and a second control winding respectively, and means for supplying from the output of said first magnetic amplifier to said second control winding a unidirectional current for setting up a magnetomotive force opposing the self-saturation in said second magnetic amplifier, thereby minimizing the increase of output of said second magnetic amplifier in response to an increase of said supply voltage and vice versa.

13. An amplifier in accordance with claim 12 in which there are provided a biasing winding for said second magnetic amplifier, and means for supplying to said biasing winding a unidirectional current for setting up a magnetomotive force aiding the self-saturation in said second magnetic amplifier.

References Cited in the file of this patent

UNITED STATES PATENTS

| | | |
|---|---|---|
| 2,306,998 | Claesson | Dec. 29, 1942 |
| 2,313,440 | Huge | Mar. 9, 1943 |
| 2,442,214 | Short | May 25, 1948 |
| 2,505,620 | John et al. | Apr. 25, 1950 |
| 2,653,293 | Huge | Sept. 22, 1953 |
| 2,721,303 | Silver | Oct. 18, 1955 |
| 2,721,304 | Silver et al. | Oct. 18, 1955 |
| 2,753,512 | Helterline et al. | July 3, 1956 |